(12) United States Patent
Libin et al.

(10) Patent No.: US 11,792,355 B1
(45) Date of Patent: Oct. 17, 2023

(54) USING SYNCHRONOUS RECORDING BY FRONT AND BACK SMARTPHONE CAMERAS FOR CREATING IMMERSIVE VIDEO CONTENT AND FOR VIDEO CONFERENCING

(71) Applicant: mmhmm inc., Little Rock, AR (US)

(72) Inventors: Phil Libin, San Francisco, CA (US); Roelof F. Botha, Los Altos Hills, CA (US)

(73) Assignee: mmhmm inc., Little Rock, AR (US)

( * ) Notice: Subject to any disclaimer, the term of this patent is extended or adjusted under 35 U.S.C. 154(b) by 0 days.

(21) Appl. No.: 17/874,784

(22) Filed: Jul. 27, 2022

Related U.S. Application Data

(60) Provisional application No. 63/228,437, filed on Aug. 2, 2021.

(51) Int. Cl.
| | | |
|---|---|---|
| *H04N 5/272* | (2006.01) | |
| *H04N 23/698* | (2023.01) | |
| *H04N 5/262* | (2006.01) | |
| *H04N 5/77* | (2006.01) | |

(52) U.S. Cl.
CPC .......... *H04N 5/272* (2013.01); *H04N 5/2628* (2013.01); *H04N 5/772* (2013.01); *H04N 23/698* (2023.01)

(58) Field of Classification Search
CPC ...... H04N 5/272; H04N 5/2628; H04N 5/772; H04N 23/698
See application file for complete search history.

(56) References Cited

U.S. PATENT DOCUMENTS

| | | | |
|---|---|---|---|
| 2015/0172069 A1* | 6/2015 | Lin | H04L 51/04 715/756 |
| 2017/0039867 A1* | 2/2017 | Fieldman | G09B 7/00 |

\* cited by examiner

*Primary Examiner* — Thai Q Tran
*Assistant Examiner* — Jose M Mesa
(74) *Attorney, Agent, or Firm* — Muirhead and Saturnelli, LLC

(57) ABSTRACT

Creating a video presentation includes obtaining a first front-camera video stream and a first back-camera video stream that are recorded synchronously using a first device having a front-camera and a back-camera and extracting a first image of a first presenter from the first front-camera video stream. Creating a video presentation also includes obtaining a second front-camera video stream and a second back-camera video stream that are recorded synchronously and extracting a second image of a second presenter from the second front-camera video stream. It is determined whether that the first back-camera video stream and the second back-camera video stream are complimentary views. Creating a video presentation also includes constructing a panoramic view by combining the first back-camera video stream and the second back-camera video stream and superimposing the first image of the first presenter and the second image of the second presenter onto to the panoramic view.

18 Claims, 6 Drawing Sheets

USING SYNCHRONOUS RECORDING BY FRONT AND BACK SMARTPHONE CAMERAS FOR CREATING IMMERSIVE VIDEO CONTENT AND FOR VIDEO CONFERENCING

CROSS-REFERENCE TO RELATED APPLICATIONS

This application claims priority to U.S. Prov. App. No. 63/228,437, filed on Aug. 2, 2021, and entitled "USING SYNCHRONOUS RECORDING BY FRONT AND BACK SMARTPHONE CAMERAS FOR CREATING IMMERSIVE VIDEO CONTENT AND FOR VIDEO CONFERENCING", which is incorporated herein by reference.

TECHNICAL FIELD

This application is directed to the fields of video recording, visual communications, and user interfaces, and more particularly to the field of synchronous recording by front and back smartphone cameras for creating and sharing immersive video content.

BACKGROUND OF THE INVENTION

With 6.4 billion worldwide subscriptions, 3.8 billion users, 78% global penetration rate, 1.38 billion annual unit sales (2020), 9.82 million available applications and controlling more than 50% of the Internet traffic, smartphones are dominating the market of mobile connected devices. Equipped with cameras, microphones, GPS navigation and IMU (Inertial Measurement Unit) sensors, such as accelerometers, gyroscopes and magnetometers, smartphones have long become location, environment, and movement aware devices; a row of additional sensors and corresponding set of applications, such as non-invasive and invasive chemical sensors for medical applications, constantly increase smartphone capabilities.

Smartphone cameras have changed the world of photography and are quickly increasing their role in the audio-video authoring, viewing and communications. Over 90% of users who have ever taken a photo, the photo with a smartphone. In 2020, 48% of US smartphone owners have used one or more of camera or photo editing applications, and already over 30% of smartphone owners have used one or more video services. By 2022, the number of video viewers in the US is expected to exceed 200 million. Additionally, 57% of the global video content is watched on mobile devices.

Virtually every contemporary smartphone is equipped with both a back camera for capturing regular photos and videos of the surroundings and a front-facing camera used for taking selfies and for video communications, which are quickly growing to become an important productivity and communications media, connecting people through their work, personal and family lives, education, training, entertainment, and other areas. Thus, on an average day, US businesses have over 11 video conferencing meetings with hundreds of millions of daily participants; on the personal usage side, almost 50% of American adults indicated their preference to use FaceTime-like applications when talking to family and friends during the pandemic.

A new approach to videoconferencing and video recording has emerged in conjunction with immersive video content and video conferencing spaces, where presenters and participants may overcome the boundaries of restrictive individual cells within a meeting grid, encouraged by key mainstream video conferencing applications; users are enabled with dynamic creation and adaptation of immersive presentation environments, enabled by mmhmm, developed by mmhmm Inc., and by other immersive applications, taking advantage of video segmentation technique.

A promising recent development in the smartphone camera usage was an introduction of the synchronous video recording by both the back-facing and the front-facing cameras (front and rear cameras), also called a dual camera recording. Such recordings first appeared in 2021 as a new feature in iOS 13 for iPhone 11 (backward compatible with some other models of iPhone). Dual camera recording is currently supported by several dozens of iOS applications, including BiCam, MixCam, Dualgram, and Doubletake. The feature is also available on Android via a free Double Side Camera application and allows combining the active content recorded by the rear camera with the presenter's video from the front camera, superimposed over the active content in a combined scene.

SUMMARY OF THE INVENTION

Notwithstanding the progress demonstrated by smartphone applications making use of a simultaneous recording by front and rear cameras, use of simultaneous recording by front and rear cameras both in content creations and in video communications, such as chats and video conferences, is underdeveloped and requires multiple improvements, including the capability of communications between two or more users looking at the same active content, captured by one of the users, switching between active videos created by different participants, combining active content from users taking their videos in proximity, etc.

Accordingly, it is important to develop mechanisms for creating immersive video presentations and for video conferencing using synchronous recording by front and back smartphone cameras.

According to the system described herein, creating a video presentation includes obtaining a front-camera video stream and a back-camera video stream that are recorded synchronously using a device having a front-camera and a back-camera, extracting an image of a presenter from the front-camera video stream by removing background objects from the front-camera video stream, and superimposing the image of the presenter onto the back-camera video stream to provide the video presentation. The image of the presenter may be semi-transparent, an outline, a silhouette, and/or a stylized/enhanced graphical version of the presenter. The presenter may control size and position of the image of the presenter superimposed onto the back-camera video stream. The presenter may control size and position of the image of the presenter using a remote control with one-handed manipulation, eye-tracking, sensors that track 3D trajectory and gesture recognition made with a free hand of the presenter with a wearable device, and/or a camera-based 3D gesture recognition mechanism. The device may be a smartphone. The video presentation may be mirrored to a device of a user, different from the presenter, to allow the user to view the video presentation and interact with the presenter. The video presentation may be mirrored only in response to the user accepting an invitation from the presenter. Creating a video presentation may also include obtaining a different front-camera video stream and a different back-camera video stream that are recorded synchronously using a different device having a front-camera and a back-camera, extracting a different image of a different presenter from the different front-camera video stream by removing background objects from the different front-camera video stream, and superimposing the image of the presenter and the different image of a different presenter onto the different back-camera video stream to provide a different video presentation. Creating a video presentation may also include providing the different video presentation to the device of the presenter to allow the presenter to view the different video presentation and interact with the different presenter. The image of the presenter and the different image of the different presenter may be superimposed onto the different back-camera video stream only in response to the presenter accepting an invitation from the different presenter.

According further to the system described herein, creating a video presentation includes obtaining a first front-camera video stream and a first back-camera video stream that are recorded synchronously using a first device having a front-camera and a back-camera, extracting a first image of a first presenter from the first front-camera video stream by removing background objects from the first front-camera video stream, obtaining a second front-camera video stream and a second back-camera video stream that are recorded synchronously using a second device having a front-camera and a back-camera, extracting a second image of a second presenter from the second front-camera video stream by removing background objects from the second front-camera video stream, determining that the first back-camera video stream and the second back-camera video stream are complimentary views, constructing a panoramic view by combining the first back-camera video stream and the second back-camera video stream, and superimposing the first image of the first presenter and the second image of the second presenter onto to the panoramic view to provide the video presentation. Creating a video presentation may also include providing the video presentation to the first device of the first presenter and to the second device of the second presenter to allow the presenters to view the video presentation and to interact. Each of the images may be semi-transparent, an outline, a silhouette, and/or a stylized/enhanced graphical version of a corresponding one of the presenters. The first presenter may control size and position of the image of the first presenter superimposed onto the panoramic view and the second presenter may control size and position of the image of the second presenter superimposed onto the panoramic view. The presenters may control the size and position of the images of the presenters using a remote control with one-handed manipulation, eye-tracking, sensors that track 3D trajectory and gesture recognition made with a free hand of the presenter with a wearable device, and/or a camera-based 3D gesture recognition mechanism. The devices may be smartphones. The devices may use GPS technology and/or IMU (Inertial Measurement Unit) technology. The GPS technology and/or IMU technology may be used in connection with determining that the first back-camera video stream and the second back-camera video stream are complimentary views. The GPS technology and/or IMU technology may be used in connection with constructing the panoramic view.

According further to the system described herein, a non-transitory computer readable medium contains software that creates a video presentation from a front-camera video stream and a back-camera video stream that are recorded synchronously using a device having a front-camera and a back-camera. The software includes executable code that extracts an image of a presenter from the front-camera video stream by removing background objects from the front-camera video stream and executable code that superimposes the image of the presenter onto the back-camera video stream to provide the video presentation. The image of the presenter may be semi-transparent, an outline, a silhouette, and/or a stylized/enhanced graphical version of the presenter. The presenter may control size and position of the image of the presenter superimposed onto the back-camera video stream. The presenter may control size and position of the image of the presenter using a remote control with one-handed manipulation, eye-tracking, sensors that track 3D trajectory and gesture recognition made with a free hand of the presenter with a wearable device, and/or a camera-based 3D gesture recognition mechanism. The device may be a smartphone. The video presentation may be mirrored to a device of a user, different from the presenter, to allow the user to view the video presentation and interact with the presenter. The video presentation may be mirrored only in response to the user accepting an invitation from the presenter. The software may also include executable code that obtains a different front-camera video stream and a different back-camera video stream that are recorded synchronously using a different device having a front-camera and a back-camera, executable code that extracts a different image of a different presenter from the different front-camera video stream by removing background objects from the different front-camera video stream, and executable code that superimposes the image of the presenter and the different image of a different presenter onto the different back-camera video stream to provide a different video presentation. The software may also include executable code that provides the different video presentation to the device of the presenter to allow the presenter to view the different video presentation and interact with the different presenter. The image of the presenter and the different image of the different presenter may be superimposed onto the different back-camera video stream only in response to the presenter accepting an invitation from the different presenter.

According further to the system described herein, a non-transitory computer readable medium contains software that creates a video presentation from a first front-camera video stream and a first back-camera video stream that are recorded synchronously using a first device having a front-camera and a back-camera and a second front-camera video stream and a second back-camera video stream that are recorded synchronously using a second device having a front-camera and a back-camera. The software includes executable code that extracts a first image of a first presenter from the first front-camera video stream by removing background objects from the first front-camera video stream, executable code that extracts a second image of a second presenter from the second front-camera video stream by removing background objects from the second front-camera video stream, executable code that determines that the first back-camera video stream and the second back-camera video stream are complimentary views, executable code that constructs a panoramic view by combining the first back-camera video stream and the second back-camera video stream, and executable code that superimposes the first image of the first presenter and the second image of the second presenter onto to the panoramic view to provide the video presentation. The software may also include executable code that provides the video presentation to the first device of the first presenter and to the second device of the second presenter to allow the presenters to view the video presentation and to interact. Each of the images may be semi-transparent, an outline, a silhouette, and/or a stylized/enhanced graphical version of a corresponding one of the presenters. The first presenter may control size and position of the image of the first presenter superimposed onto the panoramic view and the second presenter may control size and position of the image of the second presenter superimposed onto the panoramic view. The presenters may control the size and position of the images of the presenters using a remote control with one-handed manipulation, eye-tracking, sensors that track 3D trajectory and gesture recognition made with a free hand of the presenter with a wearable device, and/or a camera-based 3D gesture recognition mechanism. The devices may be smartphones. The devices may use GPS technology and/or IMU (Inertial Measurement Unit) technology. The GPS technology and/or IMU technology may be used in connection with determining that the first back-camera video stream and the second back-camera video stream are complimentary views. The GPS technology and/or IMU technology may be used in connection with constructing the panoramic view.

The proposed system processes a synchronous video recording by back and front cameras of a smartphone by a presenter (or multiple presenters) and retrieves an image of the presenter. The image of the presenter(s) may be modified (e.g., by the smartphone) to be one or more of: transparent, semi-transparent, an outline, a silhouette, a stylized/enhanced graphical version of the presenter, or any other suitable visual representation of the presenter. The system immerses the image into a scene captured by a back camera (or by multiple back cameras, if available); allows the presenter to change the location and appearance of the image of the presenter superimposed upon the screen, including size, color, transparency and visual effects of the image; allows the presenter to point to portions of the scene and perform limited editing of the scene in real time; allows the presenter to produce full interactive recordings of immersive presentations, stream immersive presentations, invite other individuals to join immersive presentations via a teleport feature by immersing dynamic images of the other individuals, processed by the respective cameras of the individuals, into the scene; conduct dialog with the teleported individuals; alter teleporting sessions by repeatedly hosting teleported individuals and teleporting to immersive presentations of the teleported individuals; synthesizing panoramic environments for joint immersive presentations from video recordings of multiple presenters located at a close distance from each other utilizing GPS and IMU sensors.

Various aspects of system functioning are explained as follows.

1. Creating immersive presentations. The system processes separately the back camera video (synonymously, the scene, the active scene, the active content) and the front camera video, the "selfie scene", which may include static or dynamic background depending on the recording environment and conditions. The system may retrieve an image of the presenter from the surrounding content of the front camera video and superimpose the image upon the scene using various segmentation techniques.

2. Rules of superimposing; managing presenter image. The rules of superimposing of the retrieved image of the presenter captured by the front-facing camera (the image of the presenter) upon the scene may include various parameters related to the size, transparency, and location of the image of the presenter within the scene, which may or may not depend on the content of the scene. For example, the system may detect the least obstructive position for the image of the presenter or may put the image of the presenter close to an object mentioned in the talk of the presenter (retrieved, on some occasions, via voice or gesture recognition, eye tracking and other technologies) and subsequently identified on the scene. Transparency, color, size, location, visual effects, blending with the scene vs. standing out from the scene, type of mask bounding the image (such as a circular or a rectangular mask), and other components of the appearance of the presenter may be altered automatically following the presentation flow or may be partially or completely controlled by the presenter, as explained below.

3. Presenter controls. Because the presenter may be continuously recording an active scene through the back-camera and may perform the presentation with variable intensity, the question of controlling the image of the presenter superimposed upon the scene requires special attention. Approaches may range from employing a remote control with the one-handed manipulation by the presenter to using eye-tracking technologies or utilizing IMUS and other sensors for tracking 3D trajectory and gesture recognition made with a free hand of the presenter with a wearable device such as a wristband or a smart ring; alternatively, a camera-based 3D gesture recognition may be used when the free hand of the presenter enters the front camera view.

4. Sharing immersive presentations with active scenes. Several methods of sharing immersive presentations based on synchronous front-and-back camera recording may include:
   a. Recording and storing immersive presentations.
   b. Streaming immersive presentations in real time (obviously, a streaming presentation may be synchronously recorded).
   c. Teleporting individuals into immersive presentations where the individuals can directly communicate with presenters. The teleporting mechanism may have several options:
      i. A single scene teleport where different individuals may be joining an immersive presentation conducted by a single presenter who is recording active content with front-and-back cameras of the smartphone, tablet, or other mobile device of the presenter.
      ii. Teleport with multiple altering scenes, where several presenters may be altering visits to each other's immersive presentations and may share the presentations with other individuals (for example, the first presenter may be attending and recording a public lecture and the second presenter may be watching and recording a NASCAR race).
      iii. Teleport with merged scenes where the system creates an integrated presentation environment by combining multiple scenes with multiple presenters immersed into the combined scene. For example, several presenters may be recording an architectural complex from different viewpoints; upon recognition of their positions and view angles, the system may synthesize a panoramic scene.
   d. Hybrid immersive presentation, where pre-recorded and stored immersive presentations may be combined with real-time active presentations by either sequencing asynchronous and synchronous content on the timeline or mixing active scenes, editing content of pre-recorded presentations, replacing or augmenting presenter images (for example, inserting the active real-time presenter into each of the pre-recorded presentations as the only presenter).

5. Teleport with a single scene. A presenter conducting an immersive presentation of active content may invite one or more individuals to join the presenter in the immersive environment. Upon receiving an invitation (for instance, a link to the scene), a future participant may teleport to the immersive presentation, whereby video of the participant captured by the front camera of the device of the participant, such as a smartphone, tablet, or notebook, may be processed simultaneously with the smartphone presentation of the presenter; an image of the participant may be extracted from the video stream and superimposed upon the immersive presentation. The combined scene with the active content captured by the back camera with the immersed images of the presenter and the participant may be mirrored to the device of the participant, so the presenter and each participant see the same immersive scene. The presenter and the participant(s) may talk, point to portions of the scene, control their position and other parameters, and may hold a teleport session in different ways.

6. Teleport with multiple altering scenes. This teleport option differs from the previous teleport option in that there are multiple immersive presentations held by different presenters who may invite each other and possibly other participants to their respective active scenes; for example, one of the presenters may be watching and recording a car race and another may attend and record a public gathering. The presenters may set up a shared journey by sending each other invitations and meeting in the environments of each other at different times. In more complex situations with multiple immersive presentations, the schedule of invitations and teleport sessions may be controlled by the system.

7. Teleport with merged scenes. Several presenters may intentionally or unknowingly record active scenes in proximity to each other. The system may identify such groups of presenters, socially or upon request, and may use built-in GPS and various type of IMU sensors, such as accelerometers, gyroscopes, and magnetometers, to track locations and movements of the presenters. Such tracking may enable the system to restore the geometry of viewing by different back cameras and synthesize the panoramic environment from separate scenes. Subsequently, the system may immerse the presenters into the panoramic environment for a joint teleport session.

BRIEF DESCRIPTION OF THE DRAWINGS

Embodiments of the system described herein will now be explained in more detail in accordance with the figures of the drawings, which are briefly described as follows.

DETAILED DESCRIPTION OF VARIOUS EMBODIMENTS

The system described herein provides a mechanism for creating, sharing, and enhancing immersive video content and presentations obtained via simultaneous recording by front-and-back cameras on smartphones and other mobile devices, including shared conferencing via teleport with single or multiple active scenes and reconstructing panoramic scenes from multiple views of immersive presenters, recording objects in proximity to each other.

Figure 1:
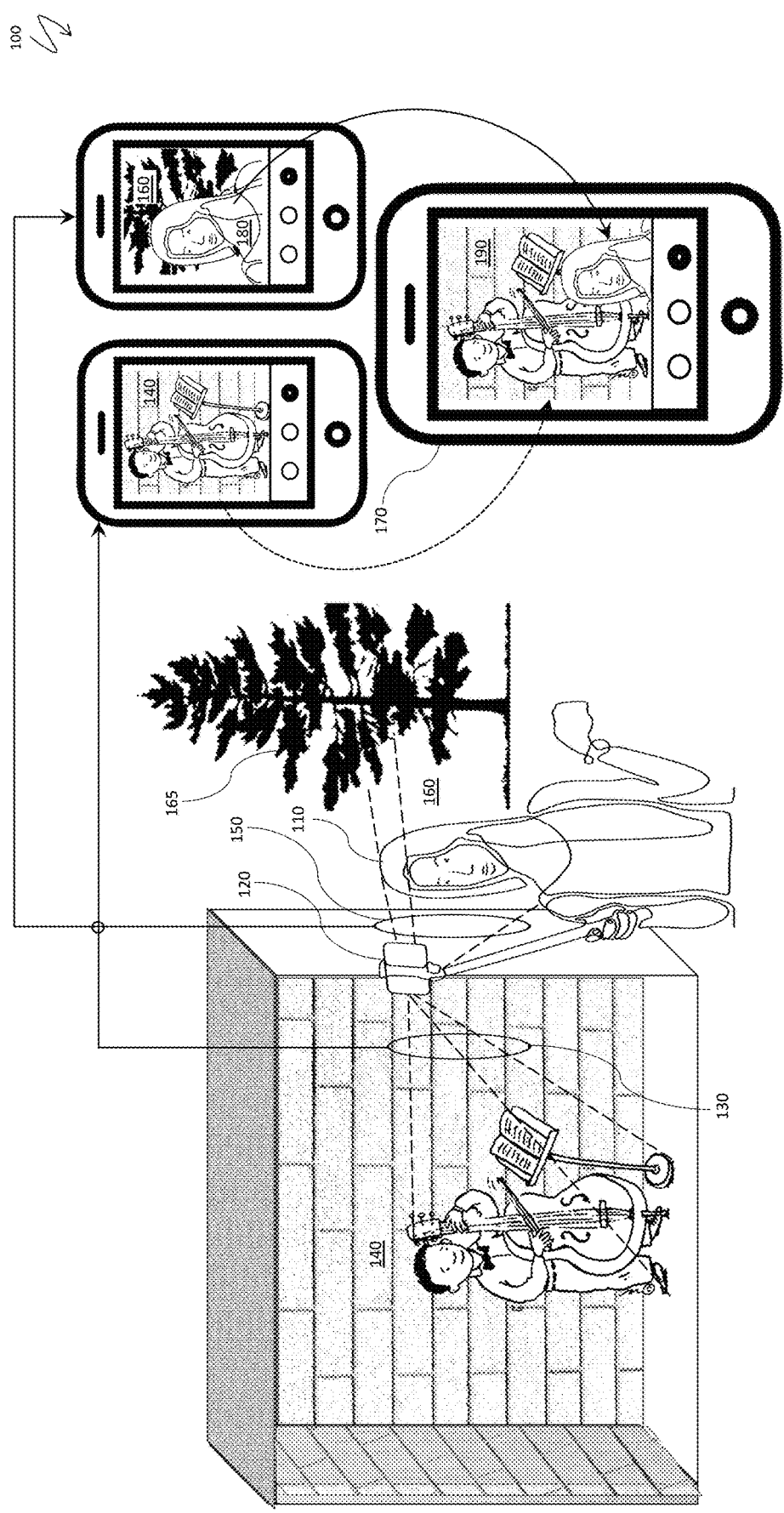
FIG. 1 is a schematic illustration of immersing an image of a presenter extracted from a front camera recording into a back camera scene, according to an embodiment of the system described herein.

FIG. 1 is a schematic illustration 100 of immersing an image of a presenter 110 extracted from a front camera recording into a back camera scene. The presenter 110 uses a smartphone 120 with a back-camera recording capability 130 and a front-camera recording capability 150 to record a back camera video 140 (the active scene) and a front camera video 160, which includes a background object 165. In different embodiments, the image of the presenter 110 may be modified (e.g., by the smartphone 120) to be transparent, semi-transparent, an outline, a silhouette, a stylized/enhanced graphical version of the presenter, or any other suitable visual representation of the presenter 110. The back camera video 140 and an image 180 of the presenter 110, extracted (segmented out) from the front camera video 160, are merged into an immersive presentation 190 on a device 170, which may be the same as the smartphone 120. Extracting the image 180 of the presenter 110 from the front camera video 160 includes eliminating portions of the front camera video 160 that are not part of the image 180 of the presenter 110, e.g., removing the background object 165.

Figure 2:
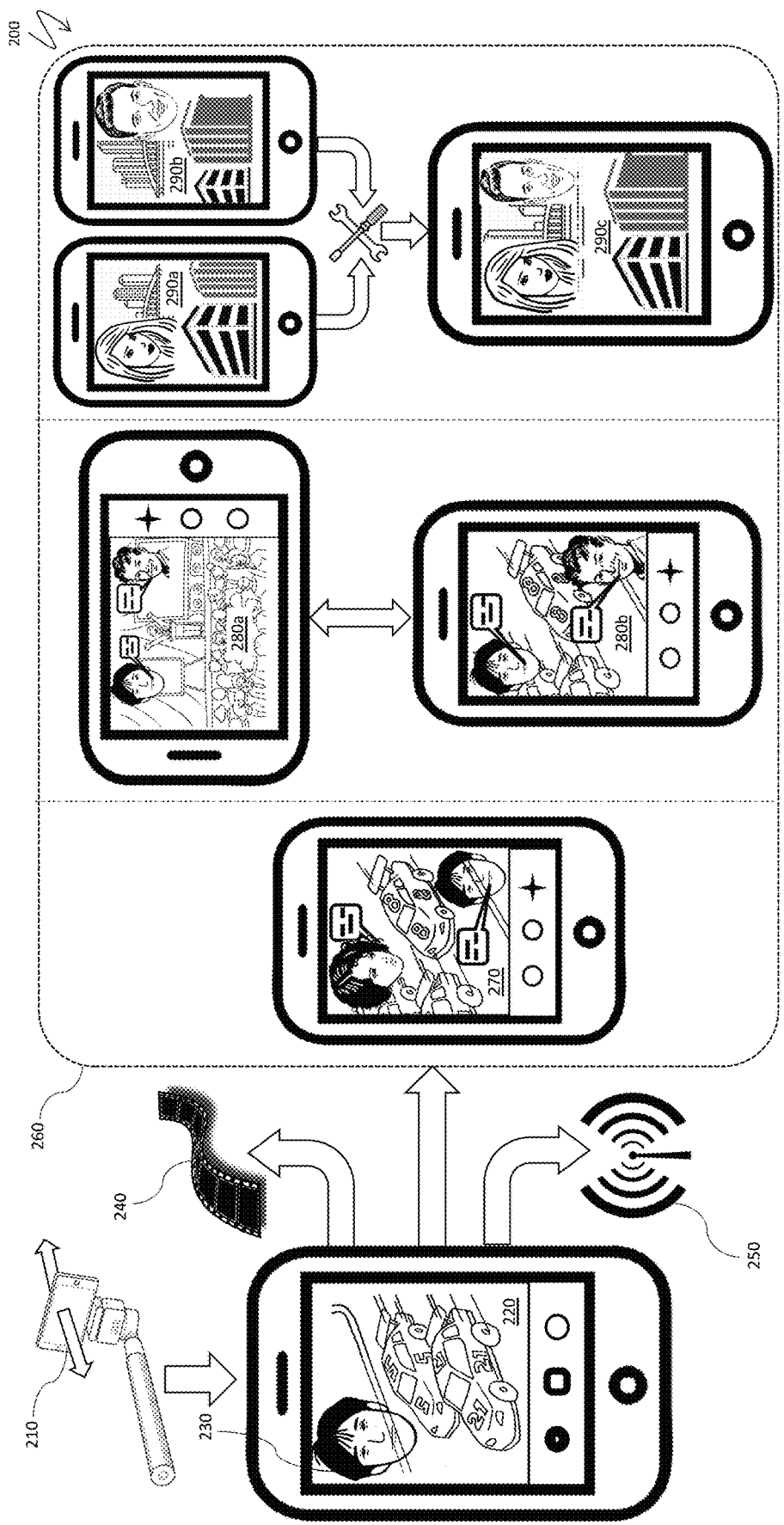
FIG. 2 is a schematic illustration of sharing methods for immersive presentations based on synchronous front-and-back camera recording, according to an embodiment of the system described herein.

FIG. 2 is a schematic illustration 200 of sharing methods for immersive presentations based on synchronous front-and-back camera recording. A front-and-back recording camera 210 produces an immersive presentation 220 with an image 230 of a presenter taken with the front-facing camera (here, the image 230 is made transparent to enhance visibility of the active scene). Three sharing options for the immersive presentation are a stored recording 240, a streaming option 250, and a set of teleport options 260 (hybrid sharing and production methods combining some of the methods 240, 250, 260 aren't shown in FIG. 2).

FIG. 2 shows three teleport options, as explained elsewhere herein (see items 4c(i)-4c(iii) in the Summary): teleport with a single scene 270, teleport with multiple altering scenes 280a, 280b, and teleport with merged scenes, where two immersive presentations 290a, 290b are merged into a panoramic presentation 290c.

Figure 3:
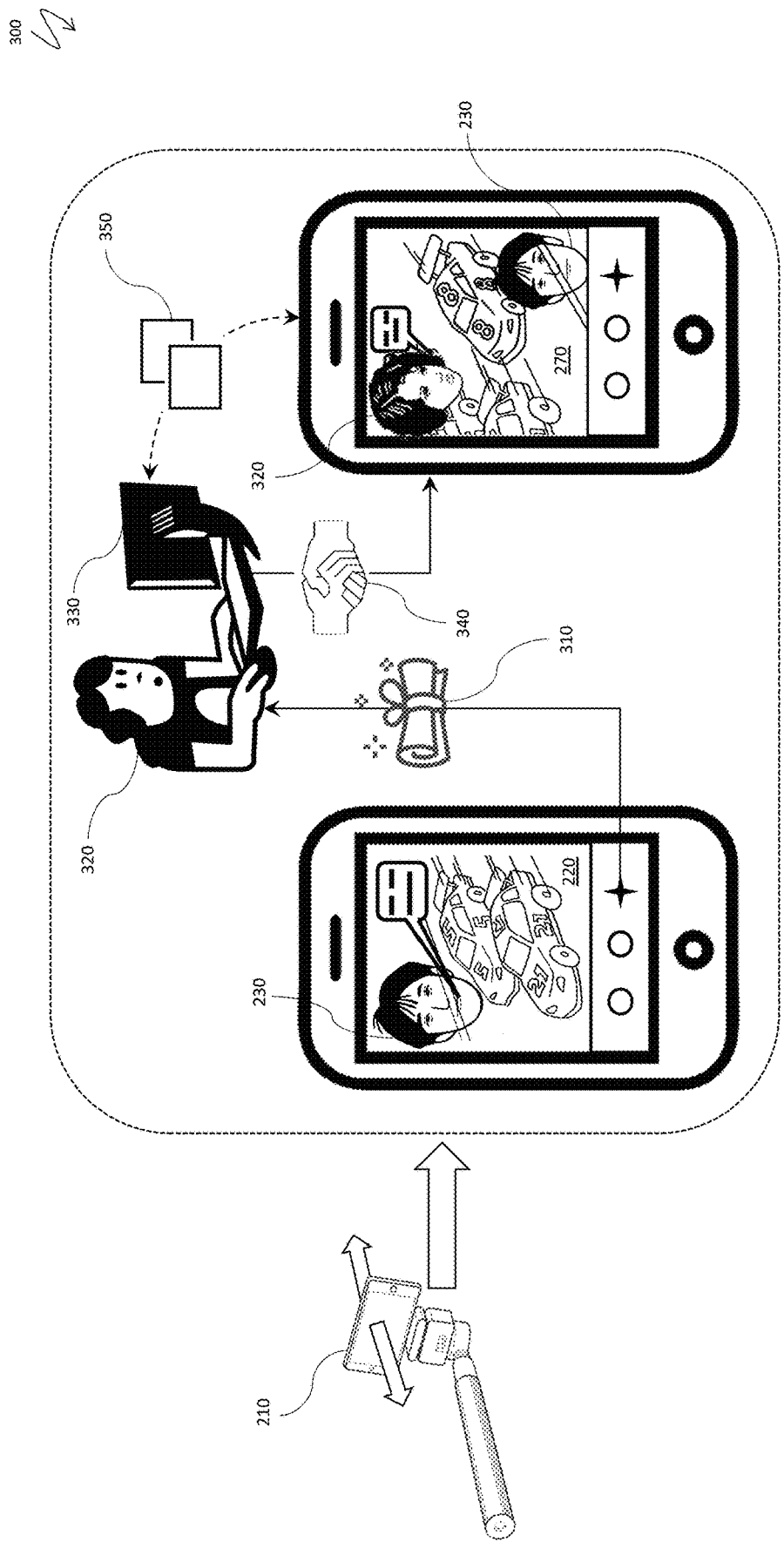
FIG. 3 is a schematic illustration of a teleport with a single scene, according to an embodiment of the system described herein.

FIG. 3 is a schematic illustration 300 of a teleport with a single scene. Analogously to FIG. 2, the front-and-back recording camera 210 produces the immersive presentation 220 with the image 230 of the presenter taken with the front-facing camera (as in FIG. 2, the image 230 is made transparent to enhance visibility of the active scene). A user 320 is working on a device 330. The presenter desires to share the immersive presentation with the user 320 and sends an electronic invitation 310 (which may be a link within an invitation text, an executable button in an email, etc.). The user 320 accepts the invitation and is instantly teleported into the immersive presentation 270, as shown by an item 340. The presentation 270 is mirrored via a software component 350 (which may be a cloud or a local component) onto the screen of the device 330, providing the ability for the presenter and the participant 320 to communicate in real time.

Figure 4:
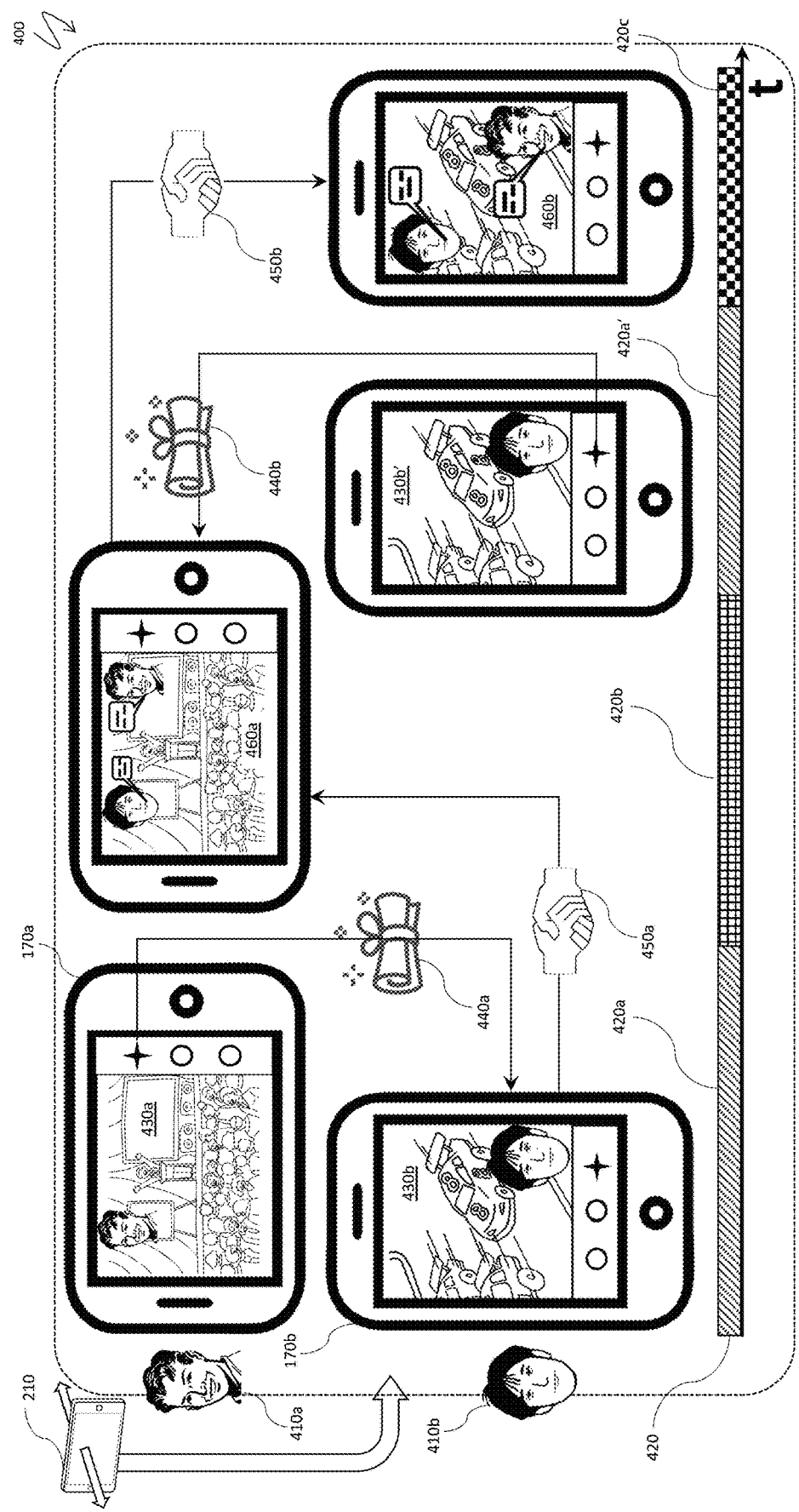
FIG. 4 is a schematic illustration of a teleport with multiple altering immersive presentations, according to an embodiment of the system described herein.

FIG. 4 is a schematic illustration 400 of a teleport with multiple altering immersive presentations. Two presenters

410*a*, 410*b* are using two different units of the front-and-back recording camera 210 (which may be different models, device types and have different operating systems installed) to produce immersive presentations in real time. A timeline 420 shows teleport scenarios. Initially, the first presenter 410*a* records on a device 170*a* (one instance of the device 210) participation of the first presenter in a public gathering as an immersive presentation 430*a*, while the second presenter 410*b* records on the device 170*b* (another instance of the device 210) an immersive presentation 430*b* of a car race. Each of the presenters 410*a*, 410*b* watches their own presentation within a time segment 420*a*. At the end of the segment 420*a*, the first presenter 410*a* sends the second presenter 410*b* an invitation 440*a* (see FIG. 3 for more details). Upon accepting the invitation, the second presenter 410*b* is instantly teleported, as shown by an item 450*a*, and joins the presenter 410*a* within an immersive presentation 460*a* for the duration of a second time segment 420*b* (in practical terms, the immersive presentation 460*a* is mirrored onto the device 170*b* of the second presenter 410*b* (shown in FIG. 4), which allows the two presenters 410*a*, 410*b* to interact, while looking at copies of the immersive presentation 460*a*.

At the end of the time segment 420*b*, the second presenter 410*b* disconnects from the presentation 460*a* driven by the presenter 410*a* and returns to furthering an immersive presentation 430*b*' for the duration of a third time segment 420*a*' where both presenters 410*a*, 410*b* are on their own. At the end of the segment 420*a*', the second presenter 410*b* sends a reciprocal invitation 440*b* to the first presenter 410*a* and, upon accepting, the first presenter 410*a* is teleported, as shown by an item 450*b*, and joins the second presenter 410*a* in watching the race and communicating within an immersive presentation 460*b* for the duration of a final, fourth time segment 420*c*.

Figure 5:
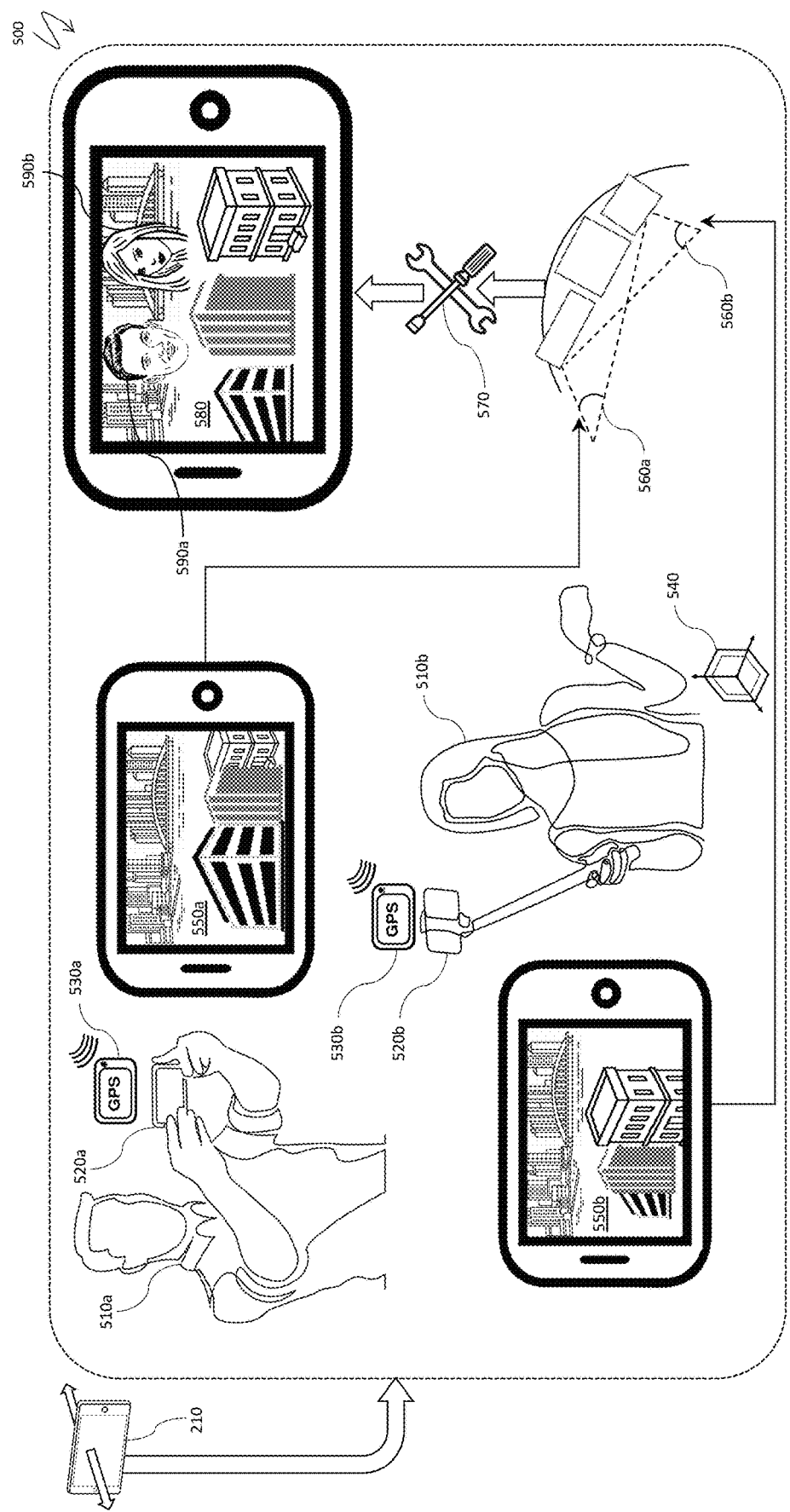
FIG. 5 is a schematic illustration of a teleport with merged panoramic scenes, according to an embodiment of the system described herein.

FIG. 5 is a schematic illustration 500 of a teleport with merged panoramic scenes. Two presenters 510*a*, 510*b* are each using one of two smartphones 520*a*, 520*b* with the front-and-back recording cameras 210. Both smartphones 520*a*, 520*b* are using GPS technology 530*a*, 530*b* and at least one of the smartphones 520*a*, 520*b* uses an IMU technology 540. The presenters 510*a*, 510*b* are recording presentations in a same area and the separate presentations are related to the same architectural complex recorded by the two back cameras of the smartphones 520*a*, 520*b*. Original active scenes 550*a*, 550*b* taken by the presenters 510*a*, 510*b* are processed by the system and identified as complementary views 560*a*, 560*b* of the same set of buildings. A system component 570 restores a panoramic environment and images 590*a*, 590*b* of the presenters 510*a*, 510*b* are immersed (teleported) into the synthesized environment by consent of the presenters 510*a*, 510*b* for subsequent communications.

Figure 6:
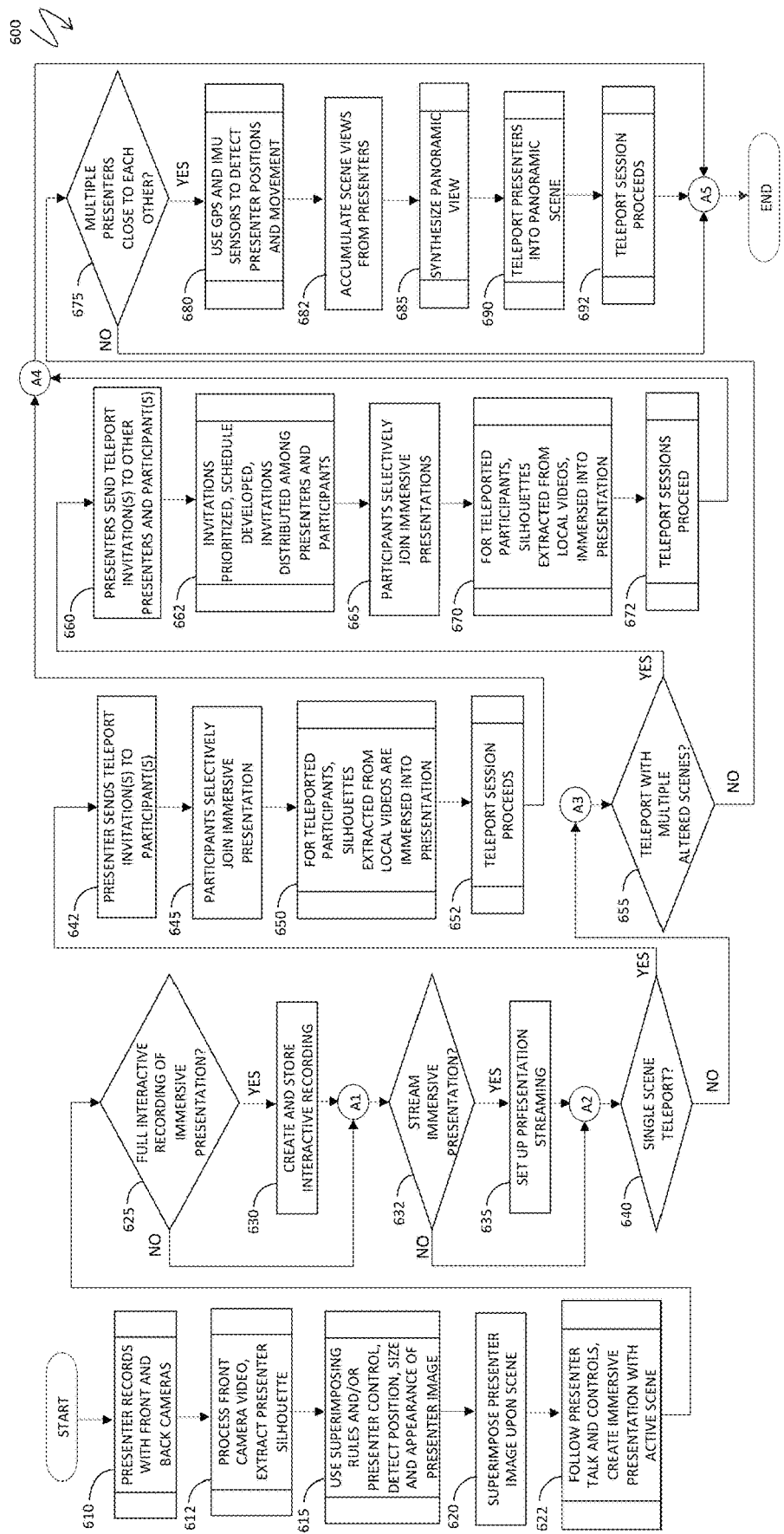
FIG. 6 is a system flow diagram illustrating system functioning in connection with producing and sharing immersive presentations based on synchronous front-and-back camera recording, according to an embodiment of the system described herein.

Referring to FIG. 6, a system flow diagram 600 illustrates system functioning in connection with producing and sharing immersive presentations based on synchronous front-and-back camera recording. Processing begins at a step 610, where a presenter records with front and back cameras of a device (e.g., smartphone) of the presenter, as explained elsewhere herein (see, for example, FIG. 1 and the accompanying text). After the step 610, processing proceeds to a step 612, where the system processes the front-camera video and extracts an image of the presenter, which may be modified (e.g., by the device/smartphone) to be transparent, semi-transparent, an outline, a silhouette, a stylized/enhanced graphical version of the presenter, or any other suitable visual representation of the presenter. After the step 612, processing proceeds to a step 615, where the system uses superimposing rules and/or presenter controls to identify the position, size, and appearance of the image of the presenter. After the step 615, processing proceeds to a step 620, where the image of the presenter is superimposed upon the active scene recorded with the back camera. After the step 620, processing proceeds to a step 622, where the system follows talk and controls of the presenter to create an immersive presentation with an active scene, captured by the back camera (see Sections 2, 3 of the Summary). After the step 622, processing proceeds to a test step 625, where it is determined whether the sharing mechanism is in the form of a stored full interactive recording of the immersive presentation, as explained, for example, in conjunction with FIG. 2. If so, processing proceeds to a step 630, where the interactive recording is created and stored.

After the step 630, processing proceeds to a test step 632, where it is determined whether the sharing mechanism is streaming of the immersive presentation (note that the test step 632 may be independently reached from the test step 625 if it is determined that the sharing mechanism is not an interactive recording). If the sharing mechanism is streaming, processing proceeds to a step 635, where the streaming of the immersive presentation is arranged. After the step 635, processing proceeds to a test step 640, where it is determined whether the sharing mechanism is a teleport with a single scene (note that the test step 640 may be independently reached from the test step 632 if it is determined that the sharing mechanism is not streaming of the immersive presentation). If the sharing mechanism is a single scene teleport, processing proceeds to a step 642, where the presenter sends a teleport invitation to a participant (or a group of participants), as explained elsewhere herein (see FIG. 3 and the accompanying text for more information). After the step 642, processing proceeds to a step 645, where participant(s) selectively accept the invitation and are teleported into the immersive presentation. After the step 645, processing proceeds to a step 650, where images of the teleported participants are extracted from local video streams of the participants and immersed into the presentation (as explained in conjunction with FIG. 3). After the step 650, processing proceeds to a step 652, where the teleport session proceeds (including establishing mirroring of the immersive presentation with teleported participants onto each teleported participant's device, as explained in FIG. 3 and the accompanying text). After the step 652, processing is complete.

If it is determined at the test step 640 that the sharing mechanism is not a single scene teleport, processing proceeds to a test step 655, where it is determined whether the sharing mechanism is a teleport with multiple scenes. If so, processing proceeds to a step 660, where presenters send teleport invitations to other presenters and participants. After the step 660, processing proceeds to a step 662, where invitations are prioritized, a teleport schedule is developed and invitations are distributed among presenters and participants. After the step 662, processing proceeds to a step 665, where presenters and participants selectively accept invitations and are teleported to selected immersive presentations (see FIG. 4 and the accompanying text). After the step 665, processing proceeds to a step 670, where images of teleported participants are extracted from local video streams and immersed into target presentations. After the step 670, processing proceeds to a step 672, where the teleport sessions proceed (including establishing mirroring of the immersive presentation with teleported participants onto each teleported participant's device, as explained in FIG. 3 and the accompanying text). After the step 672, processing is complete.

If it is determined at the test step 655 that the sharing mechanism is not a teleport with multiple scenes, processing proceeds to a test step 675, where it is determined whether multiple presenters are close to each other. If not, processing is complete; otherwise, processing proceeds to a step 680, where GPS technology and IMU sensors are used to detect presenter positions and movements. After the step 680, processing proceeds to a step 682, where the system accumulates scene views from multiple presenters. After the step 682, processing proceeds to a step 685, where the system synthesizes a panoramic view (see FIG. 5 and the accompanying text). After the step 685, processing proceeds to a step 690, where presenters are teleported (subject to mutual consent) into the synthesized panoramic scene. After the step 690, processing proceeds to a step 692, where the teleport session proceeds. After the step 692, processing is complete.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, system configurations and functioning may vary from the illustrations presented herein. Further, various aspects of the system described herein may be deployed on various devices, including, but not limited to servers, desktop computers, notebooks, smartphones, tablets, and other mobile computers. Smartphones and tablets may use operating system(s) selected from the group consisting of: iOS, Android OS, Windows Phone OS, Blackberry OS, and mobile versions of Linux OS. Servers, desktop computers, notebooks and tablets may use operating system selected from the group consisting of Mac OS, Windows OS, Linux OS, Chrome OS.

Software implementations of the system described herein may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The software may be bundled (pre-loaded), installed from an app store or downloaded from a location of a network operator. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of creating a video presentation, comprising:
obtaining a first front-camera video stream and a first back-camera video stream that are recorded synchronously using a first device having a front-camera and a back-camera;
extracting a first image of a first presenter from the first front-camera video stream by removing background objects from the first front-camera video stream;
obtaining a second front-camera video stream and a second back-camera video stream that are recorded synchronously using a second device having a front-camera and a back-camera;
extracting a second image of a second presenter from the second front-camera video stream by removing background objects from the second front-camera video stream;
determining that the first back-camera video stream and the second back-camera video stream are complimentary views;
constructing a panoramic view by combining the first back-camera video stream and the second back-camera video stream; and
superimposing the first image of the first presenter and the second image of the second presenter onto to the panoramic view to provide the video presentation.

2. The method, according to claim 1, further comprising:
providing the video presentation to the first device of the first presenter and to the second device of the second presenter to allow the presenters to view the video presentation and to interact.

3. The method, according to claim 1, wherein each of the images are at least one of: semi-transparent, an outline, a silhouette, or a stylized/enhanced graphical version of a corresponding one of the presenters.

4. The method, according to claim 1, wherein the first presenter controls size and position of the image of the first presenter superimposed onto the panoramic view and the second presenter controls size and position of the image of the second presenter superimposed onto the panoramic view.

5. The method, according to claim 4, wherein the presenters control the size and position of the images of the presenters using at least one of: a remote control with one-handed manipulation, eye-tracking, sensors that track 3D trajectory and gesture recognition made with a free hand of the presenter with a wearable device, or a camera-based 3D gesture recognition mechanism.

6. The method, according to claim 1, wherein the devices are smartphones.

7. The method, according to claim 1, wherein the devices use at least one of: GPS technology or IMU (Inertial Measurement Unit) technology.

8. The method, according to claim 7, wherein the at least one of GPS technology or IMU technology is used in connection with determining that the first back-camera video stream and the second back-camera video stream are complimentary views.

9. The method, according to claim 7, wherein the at least one of GPS technology or IMU technology is used in connection with constructing the panoramic view.

10. A non-transitory computer readable medium containing software that creates a video presentation from a first front-camera video stream and a first back-camera video stream that are recorded synchronously using a first device having a front-camera and a back-camera and a second front-camera video stream and a second back-camera video stream that are recorded synchronously using a second device having a front-camera and a back-camera, the software comprising:
executable code that extracts a first image of a first presenter from the first front-camera video stream by removing background objects from the first front-camera video stream;

executable code that extracts a second image of a second presenter from the second front-camera video stream by removing background objects from the second front-camera video stream;

executable code that determines that the first back-camera video stream and the second back-camera video stream are complimentary views;

executable code that constructs a panoramic view by combining the first back-camera video stream and the second back-camera video stream; and executable code that superimposes the first image of the first presenter and the second image of the second presenter onto to the panoramic view to provide the video presentation.

11. The non-transitory computer readable medium, according to claim 10, further comprising:

executable code that provides the video presentation to the first device of the first presenter and to the second device of the second presenter to allow the presenters to view the video presentation and to interact.

12. The non-transitory computer readable medium, according to claim 10, wherein each of the images are at least one of: semi-transparent, an outline, a silhouette, or a stylized/enhanced graphical version of a corresponding one of the presenters.

13. The non-transitory computer readable medium, according to claim 10, wherein the first presenter controls size and position of the image of the first presenter superimposed onto the panoramic view and the second presenter controls size and position of the image of the second presenter superimposed onto the panoramic view.

14. The non-transitory computer readable medium, according to claim 13, wherein the presenters control the size and position of the images of the presenters using at least one of: a remote control with one-handed manipulation, eye-tracking, sensors that track 3D trajectory and gesture recognition made with a free hand of the presenter with a wearable device, or a camera-based 3D gesture recognition mechanism.

15. The non-transitory computer readable medium, according to claim 10, wherein the devices are smartphones.

16. The non-transitory computer readable medium, according to claim 10, wherein the devices use at least one of: GPS technology or IMU (Inertial Measurement Unit) technology.

17. The non-transitory computer readable medium, according to claim 16, wherein the at least one of GPS technology or IMU technology is used in connection with determining that the first back-camera video stream and the second back-camera video stream are complimentary views.

18. The non-transitory computer readable medium, according to claim 16, wherein the at least one of GPS technology or IMU technology is used in connection with constructing the panoramic view.

* * * * *